INVENTOR
GERHARD BARTHEL
BY Barthel & Bugbee
ATTORNEYS

United States Patent Office 3,450,194
Patented June 17, 1969

3,450,194
GREENHOUSE AIR-COOLING SYSTEM
Gerhard Barthel, 14657 Juliana Ave.,
East Detroit, Mich. 48021
Filed Dec. 5, 1967, Ser. No. 688,038
Int. Cl. F24d *11/00*
U.S. Cl. 165—18　　　　　　　　　　　　　10 Claims

ABSTRACT OF THE DISCLOSURE

In this greenhouse air-cooling system, during the wintertime outside air at freezing temperatures is passed into and bubbled through water in an underground reservoir beneath the greenhouse floor until the water is frozen into ice. During the subsequent summer, air from the greenhouse is passed through another conduit system in the reservoir, where the ice extracts heat from this air to cool it before returning it to the greenhouse. When all of the ice has been melted in this manner, and the temperature of the water in the reservoir has been raised to room temperature, cool outside air is drawn through the water-cooling pipes by a fan from the outside atmosphere during the hours between midnight and sunrise when the outside air temperature has reached its minimum, thereby again reducing the temperature of the reservoir water by extracting heat therefrom before returning this cooling air to the outside atmosphere. An auxiliary subterranean water reservoir is also cooled or heated, as required, by air passed through an auxiliary piping system to maintain the temperature of its water at approximately moderate room temperature in order that this water may be used for watering the plants, the growth of which is retarded when the greenhouse atmosphere becomes too hot.

Figure 1:
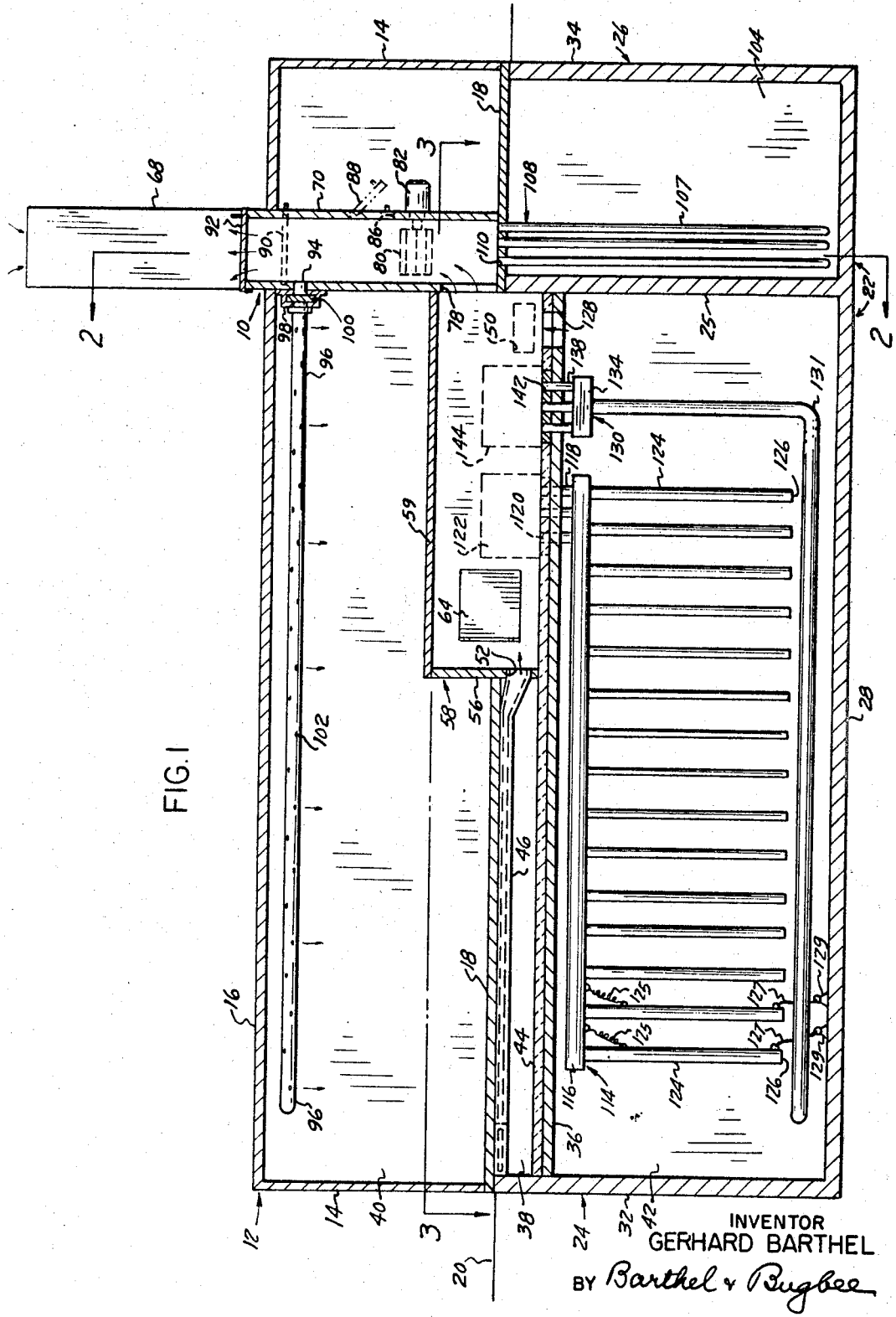
FIGURE 1 is a vertical longitudinal section through a greenhouse equipped with a cooling system according to one form of the invention, taken along the line 1—1 in FIGURE 2.
Figure 2:
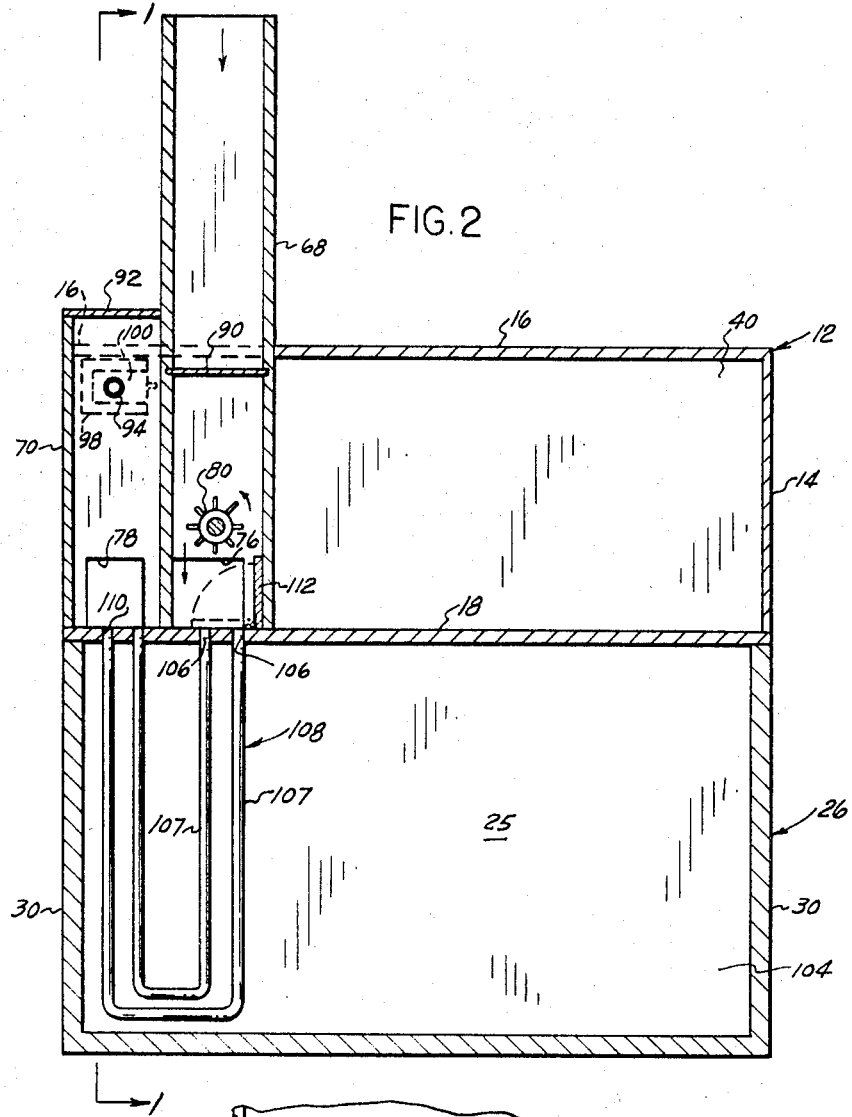
FIGURE 2 is a vertical cross-section taken along the line 2—2 in FIGURE 1.

Referring to the drawings in detail, FIGURES 1 and 2 show a greenhouse air-cooling system, generally designated 10, as installed in a conventional greenhouse 12 which is shown diagrammatically in a reduced size much smaller than would be the case in an actual installation, in order to show the details on a larger scale than would otherwise be possible. In a conventional greenhouse, the side walls 14 and roof 16 are of glass or other transparent material supported by a frame structure, but these conventional details have been omitted to simplify the disclosure. The floor 18 of the greenhouse 12 normally consists of a concrete slab composed of rectangular subsections each of which has floor portions sloping toward a central drain for carrying away excess irrigation water, but these conventional details have also been omitted for simplification purposes. The floor 18 is covered with a layer of soil (not shown) 1½ or 2 feet thick, in which the plants are grown.

The greenhouse floor 18 is located approximately at the outside ground level 20 and forms the top cover or roof of a subterranean reservoir assembly 22 (FIGURES 1 and 2) made up of an air-cooling water reservoir or main reservoir 24 and an irrigation water cooling reservoir or auxiliary reservoir 26, which are separated from one another by a bulkhead or partition wall 25. Both reservoirs 24 and 26 have common bottom and side walls 28 and 30 respectively forming extensions of one another and also have end walls 32 and 34 located remote from one another. The auxiliary reservoir 26 preferably has a capacity of about one-fourth of that of the main reservoir 24. The main reservoir 24 has a top wall 36 also in the form of a concrete slab and spaced below the greenhouse floor 18 so as to form an intermediate insulating chamber 38 therebetween in order to prevent the air within the greenhouse chamber 40 from being chilled by its close proximity to the main water cooling chamber 42 in the main reservoir 24. An added layer 44 of suitable insulating material further impedes the conductivity of heat between the chambers 40 and 42 by way of the insulating chamber 38. Since the main reservoir 28 is located beneath the ground level 20, the water therein is inherently maintained in a cooler condition than the greenhouse because of the coolness of the surrounding soil.

Figure 3:
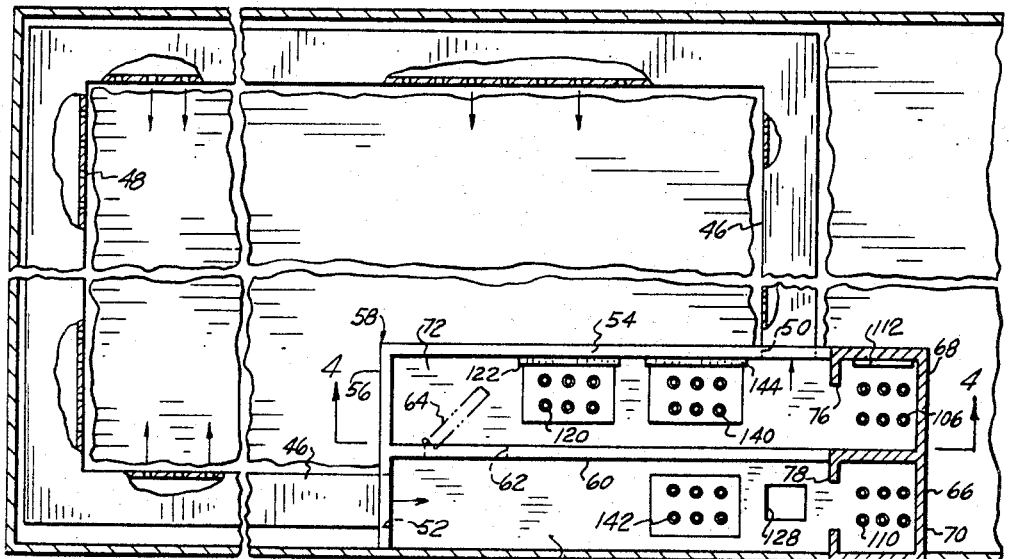
FIGURE 3 is a fragmentary horizontal section with a portion broken away and omitted to conserve space, taken along the line 3—3 in FIGURE 1.
Figure 4:
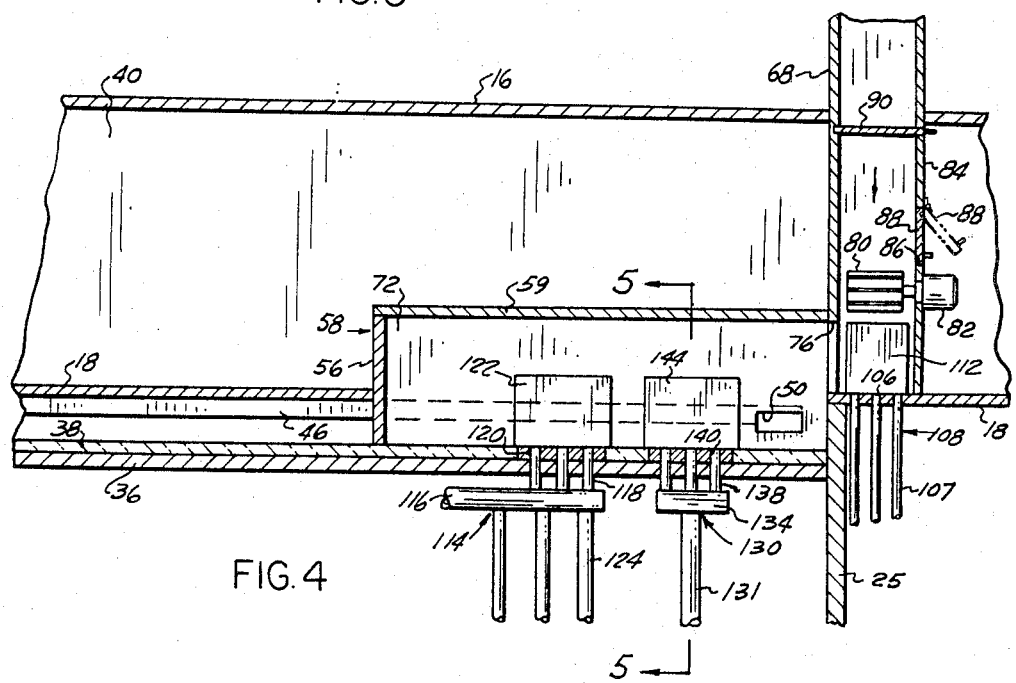
FIGURE 4 is a fragmentary vertical section through the air distribution chamber taken along the line 4—4 in FIGURE 3.

In order to further control the temperature of the insulating air within the intermediate insulating chamber 38, the latter is traversed by an auxiliary air conduit 46 provided with multiple longitudinally-spaced air discharge ports 48 (FIGURE 3) and connected at its opposite ends to inlet and outlet ports 50 and 52 respectively in the inner side and end walls 54 and 56 of an air distribution box 58 having a top wall 59 thereon and a longitudinal partition 60 therein equipped with a bypass port 62 opened and closed by a pivoted air bypass door or damper 64. Rising from the end wall 66 opposite the end wall 56 are an air inlet stack 68 and an air outlet or discharge stack 70 (FIGURES 2 and 3) which communicate with the air inlet and outlet chambers 72 and 74 respectively of the air distribution box 58 through stack inlet and outlet ports 76 and 78 respectively (FIGURE 3). Outside air is drawn downward through the air inlet stack 68 by means of a blower or fan 80 driven by an electric motor 82 mounted on a side wall 84 of the inlet stack 68 which also contains a room air inlet port 86 (FIGURE 4) which can be opened and closed by a pivoted door or damper 88. Immediately below the roof 16 within the greenhouse chamber 40 is mounted a sliding damper 90 which can be moved horizontally into and out of closing relationship with the upper part of the air inlet stack 68. In a similar manner, the upper end of the air outlet stack 70 is selectively closed or opened by means of a swinging door or damper 92. The air outlet stack 70 immediately below the greenhouse roof 16 is provided with an air outlet port 94 to which is connected the rearward end of a perforated U-shaped or loop-shaped horizontal greenhouse air inlet conduit 96 by way of a damper housing 98 containing a sliding damper 100 by which communication between the discharge stack 70 and the conduit 96 may be opened and closed. The air discharge conduit 96 is provided with multiuple holes 102 for the discharge of air into the greenhouse chamber 40.

The auxiliary reservoir 26 has a water chamber 104 (FIGURES 1 and 2), the water of which, for use in watering the plants of the greenhouse is cooled or warmed, according to the season of the year, by air drawn downward through the intake stack 68 by the fan 80 through floor intake ports 106, thence through the U-shaped pipe loops 107 of an auxiliary heat exchanger 108, thence to floor outlet ports 110 into the air discharge stack 70 and thence discharged either through the greenhouse chamber intake port 94 into the greenhouse chamber 40 or upward into the outside atmosphere, depending upon the positions of the dampers 92 and 100. Thus, the water chamber 104 of the auxiliary reservoir 26 will be warmed in the wintertime to avoid chilling plants and cooled in the summertime to stimulate their growth in the manner set forth below in connection with the operation of the invention. Whenever the temperature of the irrigation water in the auxiliary reservoir 26 does not require alteration, the inlet ports 106 are closed by a swinging auxiliary reservoir damper 112 pivoted adjacent its lower edge to swing downward into a position covering the inlet ports 106.

The water in the main water cooling chamber 42 is cooled by cool night air in the summertime, or frozen by frigid outside air in the wintertime by a main water cooling conduit system or heat exchanger 114 (FIGURES 1 and 4) which includes a main conduit or manifold 116 connected by air supply pipes 118 to cooling air inlet ports 120 in the floor 36 of the air distribution box 58 and opening out of the air inlet chamber 72 thereof. The ports 120 may be closed by a swinging damper 122 pivoted at its lower edge to swing downward over the ports 120 when it is not desired to cause air to flow through the pipes 118 into the manifold 116. Depending from the manifold 116, which is in the form of a U-shaped horizontal loop extending around the top portion of the main water chamber 42 are horizontally-spaced vertical pipes 124 open at their lower ends 126 and of varying diameters in order to tend to cause the flow of air downward through them from the manifold 116 to occur at a greater volumetric rate near the outer walls of the reservoir 24. The air which is bubbled upward from the lower ends 126 of the pipes 124 escapes from the top of the main water chamber 42 of the main reservoir 24 through a main chamber outlet port 128 (FIGURES 1 and 3) which open into the air outlet chamber 74 of the air distribution box 58. The vertical pipes 124 are preferably of flexible material, such as polyethylene plastic and are preferably suspended near their upper ends by springs 125 to prevent breakage during freezing. The lower ends 126 of the vertical pipes 124 may also be anchored as by the lines 127 and weights 129 to prevent them from being shifted laterally during freezing of the water, while at the same time permitting them to rise and fall, during freezing, due to the action of the springs 125. Only two such springs 125, lines 127 and weights 129 are shown in FIGURE 1, but it will be understood that each pipe 124 is preferably equipped therewith.

Figure 5:
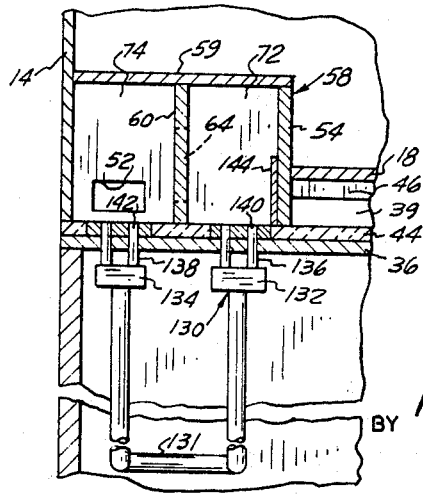
FIGURE 5 is a fragmentary vertical section through the air distribution chamber taken along the line 5—5 in FIGURE 4.

The greenhouse chamber 40 is cooled by air circulating through a U-shaped or loop-shaped greenhouse main air cooling conduit or heat exchanger 139 (FIGURES 1 and 5). The main air cooling heat exchanger 130 includes a U-shaped pipe loop 131 connected to air inlet and outlet manifolds 132 and 134 which in turn are connected by pipes 136 and 138 to air inlet and outlet ports 140 and 142 respectively opening through the floor 36 of the air distribution box 58 into the air inlet and air outlet chambers 72 and 74 respectively. The lower part of the pipe loop 131 is disposed near the bottom wall 28 where the coldest water lies. The air inlet ports 140 are adapted to be maintained open or closed by a swinging damper 144 pivoted at its lower edge to swing downward over the air inlet ports 140 or upward against the rear wall 54 of the air distribution box 58 as desired.

Research has shown that plants thrive best in an atmosphere which is neither excessively hot nor excessively cold, which also contains more carbon dioxide than the outside atmosphere, and which has even distribution of air by forced circulation to eliminate dead spots in the greenhouse atmosphere. Many greenhouses employ mechanical refrigeration to cool the greenhouse atmosphere in the summertime, at a high expense of installation and maintenance which the present invention avoids by use of natural sources of cool air which can be drawn upon during the hot summer days to cool the atmosphere in the greenhouse. It is also well settled that for irrigation of the plants in the greenhouse, the water at ordinary room temperature is most satisfactory to promote plant growth, which is retarded when the irrigation water is excessively cold.

In the operation of the invention, to warm the irrigation water in the auxiliary chamber 104 of the auxiliary reservoir 26 by means of the warm air within the greenhouse chamber 40 in order to bring it up to room temperature, the operator closes the dampers 122 and 144 to deactivate the heat exchangers 114 and 130 (FIGURES 1, 3 and 4) and opens the damper 112 at the foot of the air intake stack 68. He then opens the side air damper 88 and closes the outside air intake damper 90 in the intake stack 68 and also closes the air bypass damper 64 in the partition wall 60 of the air distribution box 58. He also closes the outside air damper 92 in the air outlet stack 70 and opens the damper 100 controlling the flow of air through the perforated greenhouse air outlet conduit 96.

As a result of these adjustments of the various dampers, when the operator starts the motor 82 to rotate the fan 80, warm air is drawn from the greenhouse chamber 40 into the lower portion of the air intake stack 68 and is forced downward through the ports 106 and pipe loops 107 of the auxiliary heat exchanger 108 (FIGURE 2), whereupon the irrigation water in the auxiliary water chamber 104 withdraws heat from the air passing through the auxiliary heat exchanger 108 and cools this air, which is then returned through the ports 110, air outlet stack 70, port 94 and greenhouse air discharge conduit 96 back into the greenhouse chamber 40, cooling the latter. By this arrangement, therefore, the apparatus of the present invention warms the irrigating water in the auxiliary reservoir 26 while at the some time cooling the greenhouse chamber 40, both of which actions are desirable for enhanced plant growth.

Even when the greenhouse atmosphere is not excessively hot, it is desirable to circulate the air therethrough in order to avoid dead spots as well as to enhance plant growth by supplying additional carbon dioxide to the greenhouse atmosphere and mixing it will the air being circulated. This is done by the damper arrangement described immediately above, except that the air bypass damper 64 in the partition wall 60 of the air distribution box 58 is now opened and the damper 112 is closed over the ports 106 when it is not desired to alter the temperature of the irrigation water in the auxiliary reservoir 26. Under such conditions and arrangements, greenhouse air as before is drawn into the lower part of the air inlet stack 68 through the side wall damper 88 and port 86 by the fan 80 and forced through the port 76 into the air inlet chamber 72 of the air distribution box 58, thence through the now open port 62 in the partition wall 60 thereof into the air outlet chamber 74 and thence through the port 78 (FIGURE 3), the air outlet stack 70, port 94 (FIGURE 2) and perforated greenhouse air discharge conduit 96, into the greenhouse chamber 40, completing the circuit and circulating the carbon dioxide wherever it is added to the system.

To freeze the water in the main water chamber 42 of the main air cooling reservoir 24 by the use of frigid outside air during the wintertime, and thereby produce a material such as of polyethylene plastic, and their upper time to cool the greenhouse chamber 40, the operator opens the upper dampers 90 and 92 in the air inlet and outlet stacks 68 and 70, closes the side wall dampers 88 and 100 thereof, also closes the auxiliary air intake damper 112 (FIGURE 2) and bypass damper 64, and likewise closes the air cooling control damper 144 while opening the damper 122 in the air distribution box 58. Upon starting the motor 82, the fan 80 draws frigid winter air from outside the greenhouse 12 downward through the air inlet stack 68 and inlet port 76 into the air inlet chamber 72 of the air distribution box 58, and forces it downward through the now open ports 120, pipes 118, through the main water cooling heat exchanger 114 including the manifold 116 and pipes 124, whence the air bubbles upward through the water from the open lower ends 126 thereof. This frigid winter outside air bubbling upward through the water in the main water chamber 42 of the main reservoir 24 extracts heat from this water before passing upward through the air discharge port 128 into the air outlet chamber 74 (FIGURE 3) and thence outward through the port 78 in the base of the air outlet stack 70, emerging through the upper end thereof into the outside atmosphere.

The repeated circulation of this frigid outside air eventually freezes the water in the main water chamber 42 into a solid block of ice. The varying diameters of the vertical pipes 124 prevent cracking of the outer walls 25, 30, 32 by pressure resulting from the premature freezing and consequent expansion of the outer layers of water when changing into ice, by causing the water to be frozen more rapidly in the central portion of the main reservoir 24 and to freeze progressively outward toward the outer walls thereof. The pipes 124 are preferably of flexible material such as of polyethylene plastic, and their upper portions are suspended by the springs 125, so that they may be pulled downward or pushed upward by the ice formed during freezing without breaking them off. FIGURE 1 shows the pipes 124 in their fully-extended positions whereas at the start of freezing or while the chamber 42 contains only water, they are pulled slightly upward by the springs 125 so that their upper portions hang in inclined positions (not shown). When the water in the chamber 42 has been frozen as nearly as possible into a solid block of ice, the operator closes the damper 122 over the ports 120 to terminate air circulation through the main cooling conduit system 114.

When as a result of cooling the greenhouse atmosphere in the summertime the supply of ice in the main reservoir 24 has been used up by melting into water, the water in the main reservoir 24 can be cooled, although not frozen, by the use of cool night air. The same arrangement of dampers is used as described immediately above in connection with freezing the water into ice during the winter months by drawing in frigid outside air during the winter months.

To cool the atmosphere of the greenhouse chamber 40 by means of the ice or cold water in the main reservoir 24, the operator closes the upper stack dampers 90 and 92 and the distribution box damper 122 and opens the lower dampers 88 and 100 and likewise the distribution box damper 144. He also closes the bypass damper 64. Upon running the fan 80, air is drawn from the greenhouse chamber 40 through the now open port 86 and forced downward through the lower portion of the air intake stack 68 through the constantly open port 76 (FIGURES 3 and 4) into the air inlet chamber 72 of the distribution box 58, whence it flows downward through the now open ports 140, pipes 136, manifold 132 and pipe loop 130 through the cold water orifice, as the case may be, in the lower part of the main reservoir chamber 42, which extracts heat therefrom and cools the air therein as the air moves upward through the manifold 134 (FIGURE 5), pipes 138 and ports 142 into the air outlet chamber 74 of the distribtuion box 58, whence it flows through the port 78 upward through the air discharge stack 70 and port 94 (FIGURE 1) into and through the perforated air discharge pipe 96 into the greenhouse chamber 40, completing the circuit and cooling the greenhouse atmosphere.

To employ outside air directly to cool the greenhouse chamber 40, as in the spring and fall, or for short periods of time during the winter, the operator opens the bypass damper 64 in the partition 60 between the inlet and outlet chambers 72 and 74 of the air distribution box 58, as shown by the dotted line position of FIGURE 3, while at the same time also opening the stack dampers 90 and 92 and the perforated air inlet pipe damper 100 while closing the stack damper 88. Upon operating the fan 80, outside air is drawn downward through the air inlet stack 68 and through the port 76 into the air intake chamber 72 of the air distribution box 58, thence through the now open bypass port 62 into the air outlet chamber 74 thereof, thence through the port 78 and up the air outlet stack 70 through the now open port 94 and through the perforated greenhouse room air inlet pipe 96 into the greenhouse chamber 40, cooling the atmosphere thereof.

During the circulation of air to and from the greenhouse chamber 40 in the manner described above, air is also circulated through the intermediate insulating chamber 38 by way of the inlet port 50 in the inlet chamber 72 (FIGURE 3), the auxiliary air conduit 46 with its multiple air discharge ports 48, and outward through the port 52 into the air outlet chamber 74 of the air distribution box 58. This action prevents the chilling of the greenhouse floor 18 and the consequent retardation of plant growth by heat conductivity therefrom through the top wall 36 of the main reservoir 24 by reason of the low temperature existing therein.

I claim:

1. A greenhouse cooling system, comprising
   a base structure adapted to form the floor of the greenhouse,
   a reservoir disposed underground beneath said base structure and adapted to contain cooling water,
   a water-cooling heat exchanger immersed in said reservoir below the intended water level thereof and having an air-conducting passageway with an inlet and an outlet therein,
   a greenhouse cooling heat exchanger also immersed in said reservoir below the intended water level thereof and also having an air-conducting passageway therethrough,
   an air intake stack and an air outlet stack adapted to extend laterally of the greenhouse and connected respectively to said passageway inlet and outlet,
   conduit means connecting said air-conducting passageway of said greenhouse cooling heat exchanger to the greenhouse for withdrawing heated air therefrom and returning cooled air thereto respectively.
   power-driven air-moving apparatus communicating with one of said stacks for selectively directing cold air from the exterior of the greenhouse through said water-cooling heat exchanger and back to said exterior,
   and means connected to said air-moving apparatus for directing warm air from the interior of the greenhouse through said greenhouse-cooling heat exchanger and back to said interior of the greenhouse.

2. A greenhouse cooling system, according to claim 1, wherein said air directing means includes an air distribution enclosure interposed between said stacks and said heat exchanger and also includes dampers controlling the flow of air selectively through said passageways.

3. A greenhouse cooling system, according to claim 2, wherein said water-cooling heat exchanger includes an air supply manifold and a multiplicity of air discharge pipes depending from and connected to said manifold in laterally-spaced relationship.

4. A greenhouse cooling system, according to claim 3, wherein said air discharge pipes have air discharge openings in the lower portions thereof adapted to effect bubbling of cooling external air upward through the water in said reservoir.

5. A greenhouse cooling system, according to claim 4, wherein said air discharge pipes vary in cross-sectional area and wherein the pipes near the periphery of said reservoir are of greater cross-sectional area than the pipes disposed inwardly therefrom.

6. A greenhouse cooling system, according to claim 1, wherein an intermediate insulating air chamber is interposed between said base structure and said reservoir and wherein means is provided for circulating air through said intermediate air chamber.

7. A greenhouse cooling system, according to claim 1, wherein an air discharge conduit is connected to said air outlet stack in laterally-projecting relationship thereto and is adapted to extend into the greenhouse, and wherein damper means is provided for controlling entry of air from said air outlet stack into said air discharge conduit and also for controlling discharge of air from said air outlet stack into the atmosphere exteriorly of the greenhouse.

8. A greenhouse cooling system, according to claim 7, wherein damper means is also provided in said air intake stack for effecting communication therewith from the interior of the greenhouse.

9. A greenhouse cooling system, according to claim 8, wherein damper means is further provided in said air intake stack for selectively opening and closing communication thereof with the atmosphere externally of the greenhouse.

10. A greenhouse cooling system, according to claim 1, wherein there is additionally provided an auxiliary water reservoir adapted to contain plant-irrigating water, wherein there is also provided an auxiliary heat exchanger immersed in said auxiliary water reservoir below the intended water level thereof, and wherein there is further provided means for selectively directing air from said air intake stack into said auxiliary heat exchanger and from said auxiliary heat exchanger into said air outlet stack.

References Cited

UNITED STATES PATENTS

| 2,000,467 | 5/1935 | Lindseth | 165—18 |
| 2,193,911 | 3/1940 | Wright | 47—17 |
| 2,819,044 | 1/1958 | Bungas | 165—18 |

ROBERT A. O'LEARY, *Primary Examiner.*

C. SUKALO, *Assistant Examiner.*

U.S. Cl. X.R.

47—17; 165—60, 104